Patented Apr. 6, 1954

2,674,602

UNITED STATES PATENT OFFICE 2,674,602

PRODUCTION OF N-ALKYL LACTAMS

Curt Schuster, Ludwigshafen (Rhine), Germany, assignor to Badische Anilin- & Soda-Fabrik Aktiengesellschaft, Ludwigshafen (Rhine), Germany No Drawing. Application January 17, 1951, Serial No. 206,505

Claims priority, application Germany January 24, 1950

5 Claims. (Cl. 260—326.5)

This invention relates to a process of producing N-alkyl lactams, especially N-alkyl pyrrolidone, N-alkyl caprolactam and their homologues.

N-alkyl lactams have hitherto been prepared by reacting lactones with N-alkylamines. This process is comparatively expensive because the N-alkylamines must generally first be prepared from the corresponding alcohols or aldehydes.

I have found that N-alkyl lactams are obtained in a simple manner by reacting lactams which are not substituted on the nitrogen atom with alcohols in the presence of catalysts for splitting off water.

As initial materials there are employed on the one hand lactams, such as pyrrolidone, caprolactam or its homologues, and on the other hand alcohols, such as methanol, ethanol, propanols, butanols, hexanols, 2-ethylhexanol, decanol, octadecyl alcohol, cyclohexanol or benzyl alcohol.

Suitable catalysts for splitting off water are for example aluminum oxide, bauxite, phosphates or sulphates, which if desired may be applied to carriers or modified with activators or diluents.

The procedure may be that the mixture of lactam and alcohol with an addition of the catalyst is heated, if necessary in a pressure vessel. It is especially preferred to work by leading the reaction mixture continuously over a fixed bed of catalysts.

The components may be employed in equimolecular amounts; sometimes it is more advantageous to use one or other of the components in excess. In the case of alcohols of high molecular weight, there takes place, besides the desired reaction, a dehydration of the alcohols to olefines or ethers, and this may be suppressed by variation of the temperature or the catalyst. The most favourable temperatures, which can easily be ascertained by a preliminary test, usually lie between about 150° and 350° C.

The N-alkyl lactams which are conveniently accessible by the process according to this invention are important intermediate products, in particular for textile assistants and synthetic materials.

The following example will further illustrate this invention but the invention is not limited to this example. The parts are by weight.

Example 150 grams of a mixture of 850 parts of pyrrolidone and 640 parts of methanol are led per hour per litre of catalyst, in a current of nitrogen, over a catalyst consisting of granular aluminum oxide which is heated to 300° C. The reaction product is first freed from water and excess methanol by distillation at low pressure and then subjected to fractional distillation at a still lower pressure. 742 parts of N-methylpyrrolidone pass over at from 80° to 82° C. at 11 millimetres (mercury gauge); the residue is mainly unreacted pyrrolidone which may be used again.

What I claim is:

1. A process for the production of an N-substituted lactam which comprises reacting a member of the group consisting of pyrrolidone and caprolactam with a member of the group consisting of unsubstituted alkyl alcohols, cyclohexanol and benzyl alcohol in the presence of an aluminum oxide catalyst at temperatures between about 150 and 350° C.

2. A process for the production of an N-substituted lactam which comprises leading a mixture of a member of the group consisting of pyrrolidone and caprolactam and a member of the group consisting of unsubstituted alkyl alcohols, cyclohexanol and benzyl alcohol over a fixed bed of an aluminum oxide catalyst at temperatures between about 150 and 350° C.

3. A process for the production of N-methylpyrrolidone which comprises leading a mixture of pyrrolidone and methanol over an aluminum oxide catalyst at temperatures of about 300° C.

4. A process for the production of N-methylpyrrolidone which consists in leading a mixture of pyrrolidone and methanol in a current of nitrogen over a catalyst consisting of granular aluminum oxide which is heated to 300° C.

5. A process for the production of N-methylpyrrolidone which consists in leading a mixture of pyrrolidone and methanol in a current of nitrogen over a fixed bed of a catalyst consisting of granular aluminum oxide which is heated to 300° C.

CURT SCHUSTER.

References Cited in the file of this patent

UNITED STATES PATENTS

| Number | Name | Date |
|---|---|---|
| 2,267,757 | Schuster et al. | Dec. 30, 1941 |

OTHER REFERENCES

P. B. L. 25,615 (Frame Nos. 10,570–10, 573), March 17, 1948.